(12) United States Patent
Yamashita et al.

(10) Patent No.: US 8,371,021 B2
(45) Date of Patent: Feb. 12, 2013

(54) MANUFACTURING METHOD OF RARE EARTH-IRON RING MAGNET WITH CONTINUOUS ORIENTATION CONTROLLED ANISOTROPY

(75) Inventors: Fumitoshi Yamashita, Shizuoka (JP); Kiyomi Kawamura, Fukui (JP); Yukihiro Okada, Osaka (JP); Hiroshi Murakami, Osaka (JP)

(73) Assignee: Panasonic Corporation, Osaka (JP)

( * ) Notice: Subject to any disclaimer, the term of this patent is extended or adjusted under 35 U.S.C. 154(b) by 494 days.

(21) Appl. No.: 12/680,869

(22) PCT Filed: May 20, 2009

(86) PCT No.: PCT/JP2009/002214
§ 371 (c)(1),
(2), (4) Date: Mar. 30, 2010

(87) PCT Pub. No.: WO2009/142005
PCT Pub. Date: Nov. 26, 2009

(65) Prior Publication Data
US 2010/0218365 A1 Sep. 2, 2010

(30) Foreign Application Priority Data
May 23, 2008 (JP) .................. 2008-135146

(51) Int. Cl.
*H01F 7/06* (2006.01)
*B22D 27/02* (2006.01)
(52) U.S. Cl. ............ 29/607; 29/609; 29/596; 29/419.2; 29/421.1; 148/101; 148/108; 164/467

(58) Field of Classification Search .................... 29/607, 29/608, 609, 596, 598, 527.1, 419.2, 421.1; 148/101, 103, 108; 164/467, 468
See application file for complete search history.

(56) References Cited

U.S. PATENT DOCUMENTS

| 3,710,291 A * | 1/1973 | Nicoud ................. 29/607 X |
| 7,328,500 B2 * | 2/2008 | Kim et al. ................. 29/609 |
| 2009/0007417 A1 | 1/2009 | Yamashita et al. |

FOREIGN PATENT DOCUMENTS

| JP | 62052913 A * | 3/1987 | ................. 29/607 |
| JP | 2003-347142 A | 12/2003 | |

(Continued)

OTHER PUBLICATIONS

Davies, H.A. et al., "Nanophase Pr and Nd/Pr-Based Rare Earth-Iron-Boron Alloys", Proceedings of the 16th International Workshop on Rare-Earth Magnets and their Applications, 2000, pp. 485-494.

(Continued)

*Primary Examiner* — A. Dexter Tugbang
(74) *Attorney, Agent, or Firm* — Brinks Hofer Gilson & Lione

(57) ABSTRACT

A process of manufacturing segments, an anisotropic direction of which is continuously changed in a plane vertically by a uniform magnetic field maintained in a constant direction and a process of arranging a plurality of segments on a circumference, extruding the segments in a ring shape by rheology based on the viscous deformation of the segments, from one thrust-direction end surface of the segments, and subsequently compressing the segments from both thrust-direction end surfaces of the segments are necessarily included. A ring magnet, anisotropy of which is controlled in a continuous direction, is provided, and a source for generating a static magnetic field has energy density (BH) max≧160 to 180 kJ/m$^3$.

5 Claims, 13 Drawing Sheets

FOREIGN PATENT DOCUMENTS

| | | |
|---|---|---|
| JP | 2005-158863 A | 6/2005 |
| WO | WO 2007/119393 A1 | 10/2007 |

OTHER PUBLICATIONS

Hirosawa, S. et al., "Structure and Magnetic Properties of $Nd_2Fe_{14}B/Fe_xB$-type Nanocomposites Prepared by Strip Casting", $9^{th}$ Joint MMM/INTERMAG FG-05, 2004, pp. 1-3.

Howe et al., "Application of Halbach Cylinders to Electrical Machines", Proceedings of the $16^{th}$ International Workshop on Rare-Earth Magnets and their Applications, 2000, pp. 903-922.

Iriyama, T., "Development Trends of High-Performance Rare-Earth Bonded Magnets", pp. 19-26 (with English abstract).

Kawamoto, Atsushi et al., "Sm2Fe17N3 Magnet Powder Made by Reduction and Diffusion Method", IEEE Transactions on Magnetics, 1999, vol. 35, No. 5, pp. 3322-3324.

Lee, R.W. et al., "Processing of Neodymium-Iron-Boron Melt-Spun Ribbons to Fully Dense Magnets", IEEE Transactions on Magnetics, 1985, vol. 21, pp. 1958-1963.

Ma, B.M., "Recent Powder Development at Magnequench", Polymer Bonded Magnets 2002, Magnequench Technology Center, 2002, pp. 1-39.

Matsuoka, Atsushi, "Examination of Performance Improvement Blushless DC Fan Motors", Institute of Electrical Engineers, pp. 13-18 (with English abstract).

Pang, Y. et al., "Comparison of Brushless Motors Having Halbach Magnetized Magnets and Shaped Parallel Magnetized Magnets", Proceedings of the $18^{th}$ International Workshop on High Performance Magnets and their Applications, Annecy, France, 2004, pp. 400-407.

Rabin, Barry H. et al., "Recent Developments in NdFeB Powder", $120^{th}$ Tropical Symposium of the Magnetic Society of Japan, 2001, pp. 23-30.

Rodewald, W. et al., "Properties and Applications of High Performance Magnets", Proceedings of the $18^{th}$ International Workshop on High Performance Magnets and their Applications, Annecy, France, 2004, pp. 52-63.

Schulze, J., "Application of High Performance Magnets in Small Motors", Proceedings of the $18^{th}$ International Workshop on High Performance Magnets and their Applications, Annecy, France, 2004, pp. 908-915.

Takeshita, T., "Magnetic Properties and Microstructures of the NdFeB Magnet Powder Produced by Hydrogen Treatment", Proceedings of the $10^{th}$ International Workshop on Rare-Earth Magnets and their Applications, 1989, pp. 551-557.

International Search Report for International Application No. PCT/JP2009/002214, dated Aug. 25, 2009, 1 page.

* cited by examiner

RING MAGNET (THICKNESS: 1.5 mm)

MANUFACTURING METHOD OF RARE EARTH-IRON RING MAGNET WITH CONTINUOUS ORIENTATION CONTROLLED ANISOTROPY

This application is a U.S. national phase application of PCT/JP2009/002214 filed on May 20, 2009, which claims priority to JP2008-135146 filed on May 23, 2008, the contents of which are incorporated herein by reference.

TECHNICAL FIELD

The present invention relates to a method of manufacturing a rare-earth/iron-based ring magnet, anisotropy of which is controlled in a continuous direction, which has a radial anisotropic region at a magnetic pole center and a non-radial magnetic anisotropic region between magnetic poles and has magnetic characteristics which do not deteriorate even in a small diameter. More particularly, the present invention relates to a method of manufacturing a rare-earth/iron-based ring magnet for controlling anisotropy in a continuous direction, for a high-performance permanent magnet type motor, which is widely used as various types of driving sources of household electrical appliances, air-conditioning equipment, and information equipment or the like and has a strong influence on power conservation, resource conservation, downsizing and noise reduction of a magnetic motor of 50 W or less.

BACKGROUND ART

A motor can be regarded as a multi-functional component which includes a rotor, a shaft, a bearing, a stator, and the like obtained by highly precisely processing various materials such as steel, non-ferrous metal, and polymer and which converts electric energy into mechanic energy by the combination thereof. In recent motors, a permanent magnet type motor which uses a magnet capable of attracting or repelling other magnetic materials and of permanently generating a static magnetic field without the external energy is widely used. From the viewpoint of physics, the magnet is different from other magnetic materials in that an effective magnetization remains even after canceling an external magnetic field, a magnetization inversion (demagnetization) eventually occurs upon being applied with a heat or a comparatively large inverse magnetic field, and then a magnetization reduces with the demagnetization. An important characteristic value of the magnet is an energy density (BH) max. The energy density shows potential energy of the magnet by the unit of volume.

Incidentally, the high performance of the strong attracting or repelling capability of the magnet is not always dependent on the type of the motor. However, in Non-patent document 1, on the basis of a relationship between a residual magnetic flux density Br corresponding to one of basic characteristics of the magnet and a motor constant KJ (KJ is a ratio between an output torque KT and a square root $\sqrt{R}$ of a resistance loss) corresponding to an index of a motor performance, it is described that an increase in energy density (BH) max of the magnet induces the higher torque density in the small-sized motor using a ring magnet, which is a target of the invention, in the state where a motor diameter, a rotor diameter, a gap, a soft magnetic material, a magnet dimension, and the like are fixed.

However, since a stator iron core of the motor is provided with teeth forming a part of a magnetic circuit and a slot accommodating coiled wires, the permeance changes with the rotation. For this reason, the increase in energy density (BH) max of the magnet increases a torque pulsation, that is, a cogging torque. The increase in cogging torque causes harmful influences such as the disturbance of a smooth rotation of the motor, the increase in vibration or noise of the motor, and the deterioration in rotation control performance.

In order to avoid such harmful influences, many studies on the cogging torque reduction of the motor have been carried out in the past.

First, regarding the magnetic pole having an even thickness in a magnetization direction, the uneven thickness of the magnet is considered. For example, Non-patent Document 2 describes a small-sized motor including magnetic pole 1 having an uneven thickness, stator iron core 2, stator iron core slot 3, and stator iron core teeth 4 as shown in FIG. 11A. That is, in Non-patent Document 2, it is described that the cogging torque becomes minimal when the surface mounted permanent magnet synchronous motor (SPMSM) has the 12-pole-18-slot uneven-thickness magnetic pole having a configuration in which a residual magnetization Br is 1.2 T, a maximum thickness at the magnetic pole center is 3 mm, and a minimum thickness at both magnetic pole ends is 1.5 mm. Additionally, in this case, the thickness is uneven from the outer diameter side of the magnetic pole. However, it is known that the cogging torque can be reduced even in the magnetic pole of which the thickness is uneven from the inner diameter side of the magnetic pole.

In addition, in Non-patent Document 2, in order to minimize the cogging torque by means of the uneven thickness of the magnetic pole shown in FIG. 11A, the minimum thickness of both magnetic pole ends is required to have the uneven thickness so that the thickness is about a half of the maximum thickness of the magnetic pole center. Accordingly, if the thickness of the magnetic pole, that is, the magnetization direction (thickness) becomes thinner, sufficient advantage cannot be obtained even when the thickness of the magnetic pole becomes uneven so as to minimize the cogging torque. Generally, since the magnetic pole is mechanically weak, the processing thereof becomes difficult.

Meanwhile, regarding the magnetic pole of which the thickness is thin in the magnetization direction, there are known a method of skewing the magnetic pole of FIG. 11B disclosed in Non-patent Document 3 or a method of continuously removing a magnetic pole area between magnetic poles of FIG. 11C disclosed in Non-patent Document 4.

According to the summary of the known techniques described above, the magnetic pole end of the thick magnetic pole is thinned by about a half so as to broaden a gap between itself and the stator iron core or the area between the magnetic poles of the thin magnetic pole is removed. Accordingly, the amount of the static magnetic field Ms, generated from the magnetic pole and flowing into the stator iron core in the form of the magnetic flux Φ, is suppressed due to the increase in magnetic resistance. As a result, in these methods, the torque density decreases by 10 to 15% in general due to the reduction in cogging torque. Accordingly, the cogging torque reduction methods using the known techniques shown in FIGS. 11A, 11B, and 11C are contrary to the technique in which the increase in energy density (BH) max of the magnet induces the increase in torque density of the motor.

Meanwhile, in Non-patent Document 5, a cogging torque reduction method of the motor is reported. In Non-patent Document 5, using a rare-earth/iron-based sintered magnet of which the thickness is thin in the magnetization direction to be 1.2 mm and the residual magnetization Mr has the high energy density of 1 T, the cogging torque is reduced by the method shown in FIGS. 11A, 11B, and 11C in which the thickness in the magnetization direction or the magnetic pole area does not decrease. That is, as shown in FIGS. 12A to 12D, a so-called Halbach Cylinder is shown of which each magnetic pole is formed into two to five divided sections, and the anisotropic direction (magnetization easy axis direction) for each divided section is adjusted stepwise. Here, in the drawing, the suffixes (2) to (5) of magnetic pole 1 indicate the number of two to five divided sections of magnetic pole 1. In addition, the direction indicated by the arrow of each divided section indicates the anisotropic direction (the magnetization easy axis).

When the 12-pole-18-slot motor is manufactured by adopting the magnetic pole having the above-described configuration, number N of the divided magnetic pole sections and the cogging torque Tcog satisfies the exponential approximation as Tcog=61.753 exp (−0.1451×N). That is, it is suggested to be ideal that, when Mθ denotes a magnetization vector angle formed between magnetization vector M at an arbitrary mechanical angle ϕ and the circumferential tangential line of the magnetic pole, a regularly continuous change with high accuracy is taken between the magnetic poles. However, in the rare-earth/iron sintered magnet having a thickness of 1.2 mm and a high energy density comparable to a residual magnetization Mr of 1 T, it is difficult to prepare plural magnetic pole sections having different anisotropic directions, to arrange minutely and regularly the magnetic pole divided sections, and to constitute the rotor by configuring a plurality of magnetic poles with high dimensional precision. For this reason, it is very difficult to manufacture a multi-pole rotor having an integral multiple of the magnetic poles and the small-sized motor adopting the multi-pole rotor. In addition, it is easily supposed that compatibility with economical efficiency are insufficient.

A magnetically isotropic magnet can be freely magnetized in a direction of a magnetization field and in any direction in accordance with a magnetic field strength distribution. For this reason, it is possible to have a magnetization pattern indicated by the circular arc arrow in a magnetic pole 1 of FIG. 13 by means of a shape of a magnetization yoke and an optimization of a magnetomotive force. Accordingly, it is possible easily to adjust a gap magnetic flux density distribution between a magnetic pole and a stator iron core to a sine wavelength. Thus, the cogging torque reduction in the small-sized motor such as the SPMSM can easily be carried out compared with the case where a thin magnetic pole is formed of a magnetically anisotropic magnet material.

A study on the isotropic rare-earth magnet material has been started by R. W. Lee (see Non-patent Document 11) and others. In Non-patent Document 11, an isotropic $Nd_2Fe_{14}B$-based bond magnet having the energy density (BH) max of 72 $kJ/m^3$ can be formed when a rapidly-solidified ribbon having the energy density (BH) max of 111 $kJ/m^3$ is fixed by a resin. Since then, a study on the isotropic rare-earth magnet material mainly obtained by the rapid solidification of the rare-earth-iron-based molten alloy has been actively carried out from the late in 1980s up to now. For example, $Nd_2Fe_{14}B$-base, $Sm_2Fe_{17}N_3$-base, and their nanocomposite magnet material with αFe-base, FeB-base, and $Fe_3B$-base using an exchange bonding based on a microscopic structure come to be used in industry. Also, in addition to an isotropic magnet material obtained by the micro control of various alloy structures, an isotropic magnet material having different powder form is widely used in industry. For example, see Non-patent Documents 6 to 10. Particularly, in Non-patent Document 10, H. A. Davies and others have proposed a material having an isotropy and an energy density (BH) max of 220 $kJ/m^3$.

However, the energy density (BH) max of the isotropic magnet material which can be used in industry is 134 $kJ/m^3$ at best. In the application of the magnet motor represented as a small-sized motor having a power of 50 W or less, generally, the energy density (BH) max of the isotropic $Nd_2Fe_{14}B$-based bond magnet is approximately 80 $kJ/m^3$ or less. That is, although twenty years have passed since the time when the isotropic $Nd_2Fe_{14}B$-based bond magnet having the energy density (BH) max of 72 $kJ/m^3$ is formed from the ribbon having the energy density (BH) max of 111 $kJ/m^3$ by R. W. Lee and others in 1985, the improved energy density (BH) max is smaller than 10 $kJ/m^3$.

Accordingly, the energy density cannot be improved in accordance with the slow development of the isotropic magnet material. Also, the increase in torque density of the motor which is a target of the invention cannot be expected.

Meanwhile, the energy density (BH) max generally increases when the isotropic magnet is exchanged to the anisotropic magnet. For this reason, in the small-sized motor, the higher torque density can be obtained, but the cogging torque increases. In addition, in the existing radial anisotropic ring magnet, if the inner/outer diameter decreases, leaked magnetic flux increases even when external magnetic field Hex is repelled by a center core of a ring cavity so as to generate a radially oriented magnetic field. Thus, energy density (BH) max deteriorates. In particular, in a diameter of 25 mm or less, the tendency becomes strong.

As an isotropic rare-earth/iron-based magnetic material related to the present invention, for example, there is $RD-Sm_2Fe_{17}N_3$ of Non-patent Document 12 or HDDR-$Nd_2Fe_{14}B$ of Non-patent Document 13.

RELATED ART DOCUMENT

Non-Patent Document

Non-patent Document 1: "Application of high performance magnets for small motors" written by J. Schulze, Proc. of the 18th international workshop on high performance magnets and their applications, 2004, pp. 908-915

Non-patent Document 2: "Comparison of brushless motors having halbach magnetized magnets and shaped parallel magnetized magnets" written by Y. Pang, Z. Q. Zhu, S. Ruangsinchaiwanich, and D. Howe, Proc. of the 18th international workshop on high performance magnets and their applications, 2004, pp. 400-407

Non-patent Document 3: "Properties and applications of high performance magnets" written by W. Rodewald, W. Rodewald, and M. Katter, Proc. of the 18th international workshop on high performance magnets and their applications, 2004, pp. 52-63

Non-patent Document 4: "Investigation of Increase in Performance of Blowing Brushless DC Motor" written by Atsushi Matsuoka, Togo Yamazaki, and Hitoshi Kawaguchi, Rotating Equipment Seminar of Electric Association, The Institute of Electrical Engineers of Japan (IEEJ), RM-01-161, 2001

Non-patent Document 5: "Application of halbach cylinders to electrical machine" written by D. Howe and Z. Q. Zhu, Proc. of the 17th int. workshop on rare earth magnets and their applications, 2000, pp. 903-922

Non-patent Document 6: "Development Tendency of High-performance Rare-earth Bond Magnet" written by Takahiko Iriyama, Ministry of Education, Culture, Sports, Science and Technology, Innovation Creation Project/Symposium of Efficient Usage of Rare-earth Resource and Advanced Material, 2002, pp. 19-26

Non-patent Document 7: "Recent developments in Nd—Fe—B powder" written by B. H. Rabin, and B. M. Ma, 120th Topical Symposium of the Magnetic Society of Japan, 2001, pp. 23-28

Non-patent Document 8: "Recent powder development at magnequench" written by B. M. Ma, Polymer Bonded Magnets 2002, 2002

Non-patent Document 9: "Structure and magnetic properties of $Nd_2Fe_{14}B$/FexB-type nanocomposite permanent magnets prepared by strip casting" written by S. Hirasawa, H. Kanekiyo, T. Miyoshi, K. Murakami, Y. Shigemoto, and T. Nishiuchi, 9 th Joint MMM/INTERMAG, FG-05, 2004

Non-patent Document 10: "Nanophase Pr and Nd/Pr based rare-earth-iron-boron alloys" written by H. A. Davies, J. I. Betancourt, and C. L. Harland, Proc. of 16th Int. Workshop on Rare-Earth Magnets and Their Applications, 2000, pp. 485-495

Non-patent Document 11: "Hot-pressed Neodymium-Iron-Boron magnets" written by R. W. Lee, E. G. Brewer, N. A. Schaffel, IEEE Trans. Magn., Vol. 21, 1958 (1985)

Non-patent Document 12: "SmFeN magnet powder prepared by reduction and diffusion method" written by A. Kawamoto, T. Ishikawa, S. Yasuda, K. Takeya, K. Ishizaka, T. Iseki, K. Ohmori, IEEE Trans. Magn., 35, 1999, p. 3322

Non-patent Document 13: "Magnetic properties and microstructure of the Nd—Fe—B magnet powders produced by hydrogen treatment" written by T. Takeshita and R. Nakayama, Proc. 10th Int. Workshop on Rare-earth Magnets and Their Applications, 1989, pp. 551-562

SUMMARY OF THE INVENTION

According to a method of manufacturing a rare-earth/iron-based ring magnet, anisotropy of which is controlled in a continuous direction of the present invention, in an essential first step, when an angle between a direction of a uniform external magnetic field Hex and an inner/outer circumferential tangent line corresponding to an arbitrary mechanical angle φ of a rotor is Hθ, segments having inner/outer circumferential sections, which change angle Hθ corresponding to the mechanical angle φ is molded in a magnetic field according to external magnetic field Hex. In an essential second step, a plurality of segments are arranged on a circumference according to the number of poles, the segments are extruded in a ring shape using rheology based on viscous deformation thereof from one thrust-direction end surface of the segments, and the segments are compression-molded from both thrust-direction end surfaces so as to control anisotropy in the continuous direction.

According to the present invention, by providing a method of manufacturing an anisotropic ring magnet, it is possible to increase energy density (BH) max which is the demerit of an isotropic magnet 2 times or more so as to increase the torque density of the small-sized motor and to reduce an obstacle due to cogging torque of a radial anisotropic magnet having the same shape, for example, noise.

In a conventional motor using a radial anisotropic ring magnet having no a clear non-radial anisotropic region, such as in-plane anisotropy, if energy density (BH) max of the magnet is increased, a magnetization vector angle Mc of a magnetic pole center relative to a mechanical angle φ and a magnetization vector angle Md of a magnetic pole end are Mc≅Md. To this end, a change Md/φ of the magnetization vector angle Md of the magnetic pole end relative to the mechanical angle φ is exponentially increased. However, a change Md/φ of the magnetization vector angle Md of the magnetic pole end relative to the mechanical angle φ according to the present invention can be suppressed to be equal to or less than that of an isotropic magnet by continuous direction control of anisotropy. As a result, in spite of a high-performance rare-earth/iron-based ring magnet in which energy density (BH) max is substantially 2 to 10 times of a ferrite polar anisotropic magnet or an isotropic $Nd_2Fe_{14}B$ magnet, it is possible to increase torque density without increasing cogging torque of the motor. In particular, it is possible to produce a plurality of segments without deteriorating energy density (BH) max due to deterioration of a radial orientation magnetic field such as a radial anisotropic ring magnet even when a diameter thereof is small.

Accordingly, the present invention is widely used in various types of driving sources of household electrical appliances, air-conditioning equipment, and information equipment or the like. The present invention makes available for energy conservation, resource conservation, mini, noise reduction for a motor of 50 w or less.

EMBODIMENTS OF THE INVENTION

Figure 1A:
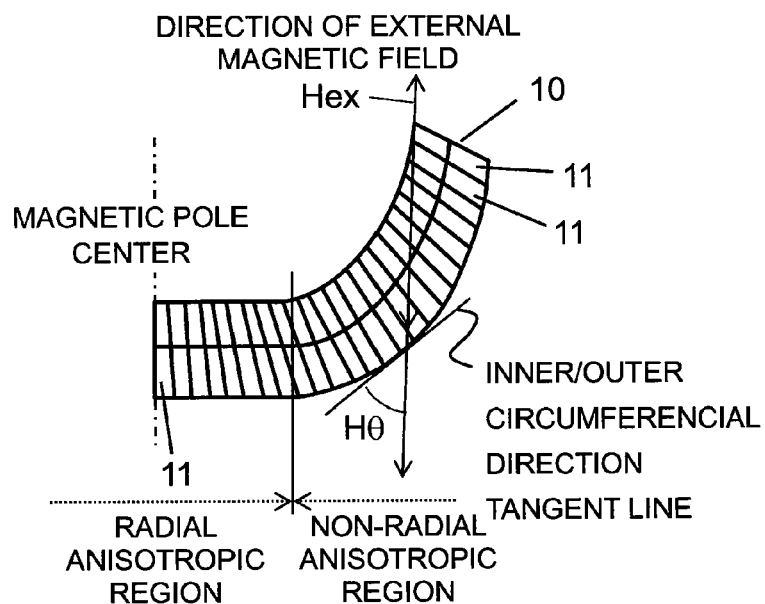
FIG. 1A is a first conceptual diagram showing anisotropic direction control.

Hereinafter, the embodiments of the present invention will be described with reference to the accompanying drawings.

Embodiment

The present invention necessarily includes the following two processes. As one process, there is a process of manufacturing a segment, an anisotropic direction of which is continuously changed in a plane vertically by a uniform magnetic field maintained in a constant direction, together with mechanical design of a magnet. That is, in the manufactured segment, the anisotropic direction is continuously changed from a direction perpendicular to a surface, which receives a uniform magnetic field, to an enlarged direction of the surface. As another process, there is a process of arranging a plurality of segments on a circumference, extruding the segments in a ring shape by rheology based on the viscous deformation of the segments, from one thrust-direction end surface of the segments, and subsequently compressing the segments from both thrust-direction end surfaces of the segments.

The necessary manufacturing process related to the present invention will be described in more detail. First, in a first necessary manufacturing process of the present invention, a segment having a plurality of inner/outer circumferential sections is molded in a magnetic field according to a uniform external magnetic field Hex. Here, the inner/outer circumferential sections refer to sections which change angle H$\theta$ corresponding to a mechanical angle $\phi$. In addition, angle H$\theta$ refers to an angle between a direction of the uniform external magnetic field Hex and an arbitrary position of the segment, that is, an inner/outer circumferential direction tangent line corresponding to a final rotor mechanical angle $\phi$. As a method of molding the segment, a known injection method or extrusion method may be used, but a compression method in an orthogonal magnetic field is preferable in order to set energy density (BH) max to 160 to 180 kJ/m$^3$.

In a second necessary manufacturing process of the present invention, first, a plurality of segments manufactured in the first necessary manufacturing process arranged on a circumference according to the number of poles. Extrusion is performed in a ring shape using rheology based on the viscous deformation thereof, from one thrust-direction end surface of the segments. Subsequently, compression molding is performed from both thrust-direction end surfaces of the segments so as to form a rare-earth/iron-based ring magnet, anisotropy of which is controlled in a continuous direction.

In addition, the number of plurality of segments is an even number of 2 or more, and may depend on the design concept of a small-sized motor according to the present invention.

Incidentally, when the external magnetic field Hex is given in a state in which a rare-earth/iron-based magnet material is freely rotated, the magnet material is magnetized and aligned in the direction of the external magnetic field Hex. Accordingly, a magnetization vector angle M between the external magnetic field Hex and the inner/outer circumferential direction tangent line in the segment cross-section, that is, an anisotropic direction, becomes M≅H$\theta$.

For example, a magnetization vector angle of a radial anisotropic region of an anisotropic magnetic pole of a ring magnet is Mc, a magnetization vector angle of a non-radial anisotropic region of an anisotropic magnetic pole of a ring magnet is Md, and an error of angle H$\theta$ needs to be small. In setting of a segment shape, a cross-sectional shape is preferably obtained as follows. That is, a rigid body having angle H$\theta$ at an arbitrary mechanical angle $\phi$ is rotated so as to change only the anisotropic direction without changing an anisotropic degree such that an aggregate of rigid bodies is analyzed by a non-linear structure so as to obtain the cross-sectional shape of the segment. In addition, the rotation of the aggregate of the rigid bodies each having the angle H$\theta$ relative to the position of the arbitrary mechanical angle $\phi$, which changes only the anisotropic direction without changing the anisotropic degree, uses shearing flow and elongational flow of a molten linear polymer, which occur by heat and external force, and rheology based on the viscous deformation obtained by overlapping them.

Next, in direction control of anisotropy of the present invention, an optimal anisotropic direction and distribution will be described. Here, a mechanical angle of a stator iron core teeth around a rotation axis center as an origin is $\phi$s and a mechanical angle of a magnetic pole center of a ring magnet around the rotation axis center as the origin is $\phi$r. At this time, in the preferable control of the continuous direction of anisotropy according to the present invention, a region in which the magnetization vector angle Mc with a rotation direction tangent line of a magnetic pole in a region corresponding to $\phi$s≅$\phi$r is 90 degree, that is, a radial anisotropic region (hereinafter, properly referred to as a radial region), is preferably provided. The radial region is a region of a segment in which a magnetization vector (anisotropic direction) is appropriately directed to a rotation axis center direction. In addition, an error average of the anisotropic direction of the radial region is 2 degrees or less. In addition, a region from a radial region in which the magnetization vector angle is Mc to a radial region in which the magnetization vector angle of an adjacent magnetic pole (heteropole) is Mc is called a non-radial anisotropic region (hereinafter arbitrary called non-radial region). That is, in this non-radial region, magnetization vector (anisotropic direction) is directed to direction deviated from rotation axis center direction. When the magnetization vector angle of the non-radial region is Md, it is preferable that a primary regression equation which applies a distribution of Md and the mechanical angle $\phi$ corresponding to the non-radial region is $\phi$=a×Md+b (a and b are coefficients). This indicates that the anisotropic direction in the vicinity of the boundary of the magnetic pole becomes in-plane anisotropy. In the present invention, a correlation coefficient r of the primary regression equation of $\phi$ and Md is set with an accuracy of 0.995 or more.

If the above anisotropic direction of the mechanical angle $\phi$ and the distribution thereof are given, it is possible to minimize the reduction of amount of the static magnetic field Ms generated by the magnetic pole of the ring magnet, which reaches the stator iron core teeth. In addition, when the magnetization vector angle of the non-radial region is Md, it is possible to reduce the cogging torque of the motor by setting correlation coefficient r of the primary regression equation which gives the distribution of Md and the mechanical angle $\phi$ with the accuracy of 0.995 or more.

As described above, it is possible to stabilize the flow into the stator iron core of the static magnetic field generated by the magnetic pole of the ring magnet so as to suppress reduction. In addition, by stabilizing the reverse of the polarity of the static magnetic field between the magnetic poles with respect to the mechanical angle φ, the optimal anisotropic direction and the distribution are obtained.

Meanwhile, in order to realize downsizing of the motor and energy conservation using the rare-earth/iron-based ring magnet, anisotropy of which is controlled in the continuous direction, according to the present invention, the magnitude of the static magnetic field generated from the magnetic pole is also of importance. Therefore, in the present invention, in a process of manufacturing a ring magnet having a uniform anisotropic direction and distribution thereof, and, more particularly, when the ring magnet is manufactured from segments, deterioration of magnetic characteristics is limited. In the present invention, a difference in residual magnetization Mr between the segment and the ring magnet manufactured therefrom is 0.03 T or less and a difference in anisotropic dispersion σ thereof is less than 7%. In addition, as the level of the static magnetic field, residual magnetization Mr of the anisotropic direction may be 0.95 to 1.05 T, magnetic coercive force HcJ may be set to 0.85 to 0.95 MA/m, and energy density (BH) max may be set to 160 to 180 kJ/m$^3$.

In addition, since the ring magnet according to the present invention is configured by segments molded in a uniform magnetic field, it is advantageous in that energy density (BH) max does not deteriorate even when the ring magnet has a small diameter. In general, if the diameter of a radial anisotropic magnet is 25 mm or less, energy density (BH) max is reduced by the reduction of a radial magnetic field for orientation. For this reason, in such a small-sized motor, an isotropic $Nd_2Fe_{14}B$ magnet having (BH) max≈80 kJ/m$^3$ is mainly used, but more effect is obtained in downsizing of the existing motor and energy conservation.

As the configuration of the segment suitable for ensuring rheology and energy density (BH) max of 160 to 180 kJ/m$^3$, for example, the following structure is used. That is, an $Nd_2Fe_{14}B$-based rare-earth/iron-based magnet material of 150 µm or less has a macro structure separated in a matrix (continuous phase) of a binding agent and a $Sm_2Fe_{17}N_3$-based rare-earth/iron-based magnet material having an average particle diameter of 3 to 5 p.m. Preferably, the volume ratio of the rare-earth/iron-based magnet material having energy density (BH) max of 270 kJ/m$^3$ or more is set to 80 vol. % or more.

Figure 1B:
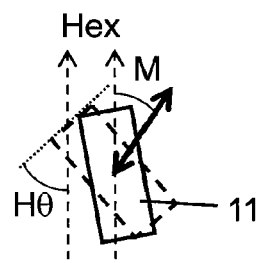
FIG. 1B is a second conceptual diagram showing anisotropic direction control.
Figure 1C:
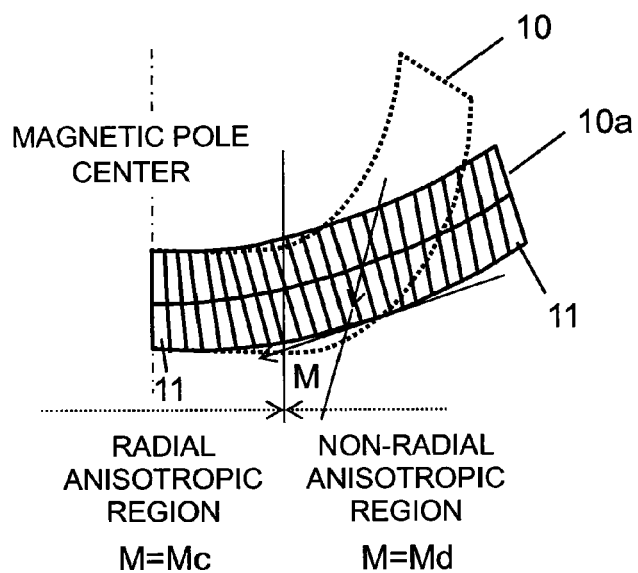
FIG. 1C is a third conceptual diagram showing anisotropic direction control.

FIG. 1A is a first conceptual diagram showing anisotropic direction control, FIG. 1B is a second conceptual diagram showing anisotropic direction control, and FIG. 1C is a third conceptual diagram showing anisotropic direction control.

In order to realize a rare-earth/iron-based ring magnet, anisotropy of which is controlled in a continuous direction, according to the present invention, first, segment 10 shown in FIG. 1A is prepared. Segment 10 becomes a radial anisotropic region in which the distribution of angle Hθ between external magnetic field Hex having a uniform direction and inner/outer circumferential section 11 at an arbitrary position is 90 degrees in a magnetic pole center portion. Segment 10 has a non-radial anisotropic region in which angle Hθ is continuously changed from 90 degrees in a primary equation of the mechanical angle φ such that in-plane anisotropy is obtained in a circumferential magnet end. FIGS. 1A and 1C show a cross-sectional shape of the right half from the center of the segment magnet. FIG. 1B shows the magnet section which is inner/outer circumferential section 11 at the arbitrary position, angle Hθ and the magnetization vector angle M (Mc in the radial anisotropic region and Md in the non-radial anisotropic region).

Next, a plurality of segments 10 according to the present invention arranged on a circumference so as to be pressurized from one thrust-direction end surface of segments 10. In addition, the segments are extruded in a ring shape using rheology based on the viscous deformation of segments 10 and the plurality of segments 10 extruded in the ring shape is compression molded from both thrust-direction end surfaces. Then, segments 10 are deformed like segment 10a of FIG. 1C. In respective inner/outer circumferential sections 11 of deformed segments 10a, magnetization vector angle M indicating the anisotropic direction is rotated as shown in FIG. 1B so as to obtain a ring magnet having angle Hθ and magnetization vector angle M (Mc and Md) according to the distribution.

Next, a process of extruding, compressing and molding a plurality of segments according to the present invention so as to manufacture a ring magnet will be described with reference to FIGS. 2A and 2B.

Figure 2A:
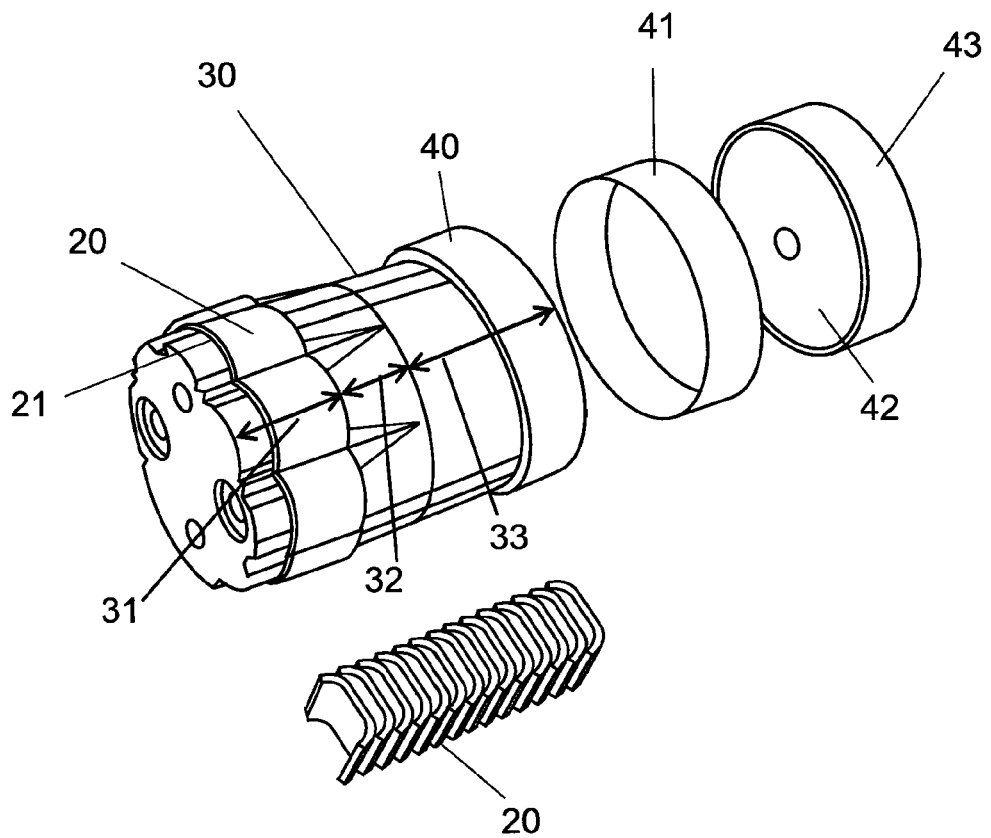
FIG. 2A is a perspective appearance view showing an extrusion compression process.

FIG. 2A is a perspective appearance view showing an example of an extrusion compression process according to the present invention. FIG. 2B is a cross-sectional configurational view of an extrusion compression molding die according to the present invention. In FIG. 2A, in order to facilitate understanding, the example of the extrusion compression process in a state of excluding the extrusion compression molding die shown in FIG. 2B is shown.

As shown in FIG. 2A, extrusion molding core 30 used in the extrusion compression process has region 31, region 32 and region 33. In region 31 of extrusion compression core 30, pre-molding segment magnets 20 corresponding to segments 10 are arranged.

Figure 2B:
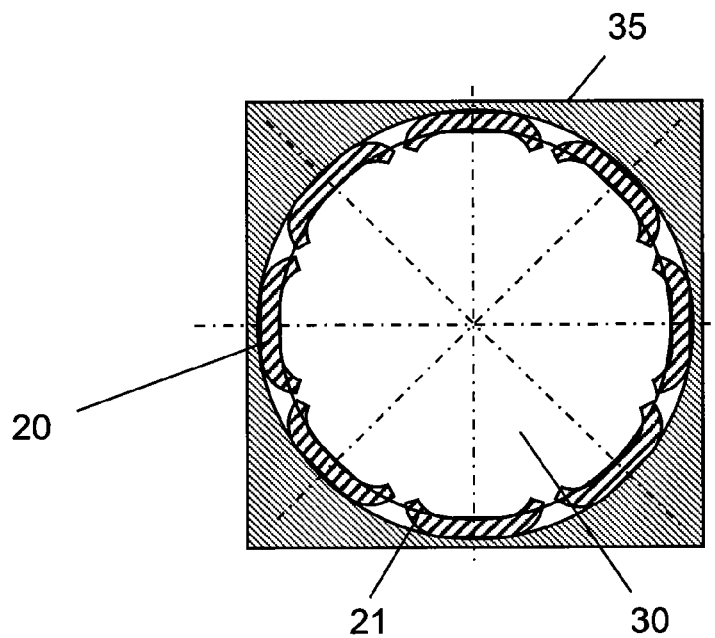
FIG. 2B is a cross-sectional configurational view of an extrusion compression molding die.

In region 31, as shown in FIG. 2A, pre-molding segment magnets 20 arranged on the circumference are received at a predetermined position together with extrusion compression molding die 35 shown in FIG. 2B. In region 32, using rheology of segment magnets 20 received in region 31, extrusion is performed in the shape of FIG. 1C from FIG. 1A. In region 33, segment magnets 20 extruded in region 32 are compression molded in the ring shape. In detail, at least a portion of the thrust-direction segment end surface 21 shown in FIG. 2A is pressed using a ring-shaped punch, and the plurality of pre-molding segment magnets 20 is simultaneously extruded from region 31 to portion 33 through region 32. The plurality of segment magnets 20 deformed by rheology and extruded from region 32 to region 33 is compression molded by operating the ring-shaped punch in the reverse direction of the extrusion direction. Here, extrusion resistance of the segments using rheology is not substantially generated, but the segments are thermally compressed and integrated with pressure of 20 to 60 MPa in a final step of compression molding.

Extrusion compression molded ring magnet 40 is demolded from a mold and is then subjected to a heating treatment such that a demolded thermally-hardened magnet 41 is formed as shown in FIG. 2A. Ring magnet 41 is finally combined with rotor iron core 42 such that, for example, 8-pole ring magnet rotor 43 is formed.

The present invention uses a thermosetting resin composition adjusted so as to apply rheology to pre-molding segment magnets 20 as shown at least in FIGS. 1A to 1C or FIG. 2A, together with an anisotropic rare-earth/iron-based magnetic material.

Figure 3A:
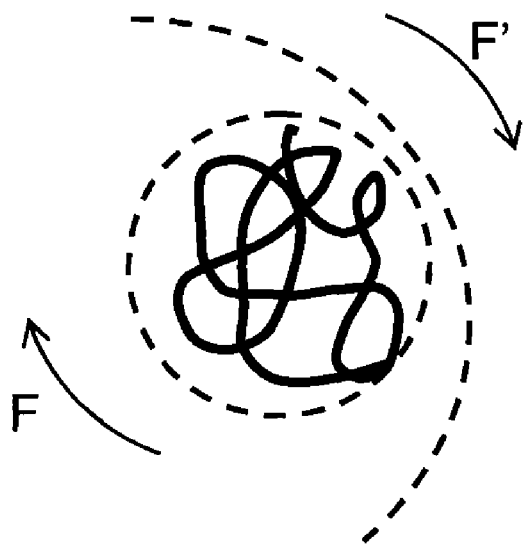
FIG. 3A is a first conceptual diagram showing a flowing state according to external force of a molten polymer.
Figure 3B:
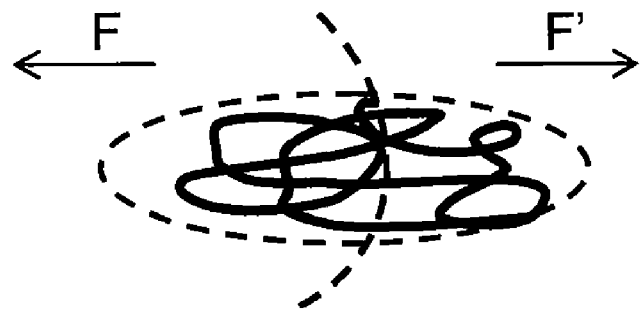
FIG. 3B is a second conceptual diagram showing a flowing state according to external force of a molten polymer.

FIG. 3A is a first conceptual diagram showing a flowing state according to external force of a molten polymer. FIG. 3B is a second conceptual diagram showing a flowing state according to external force of a molten polymer.

Figure 4:
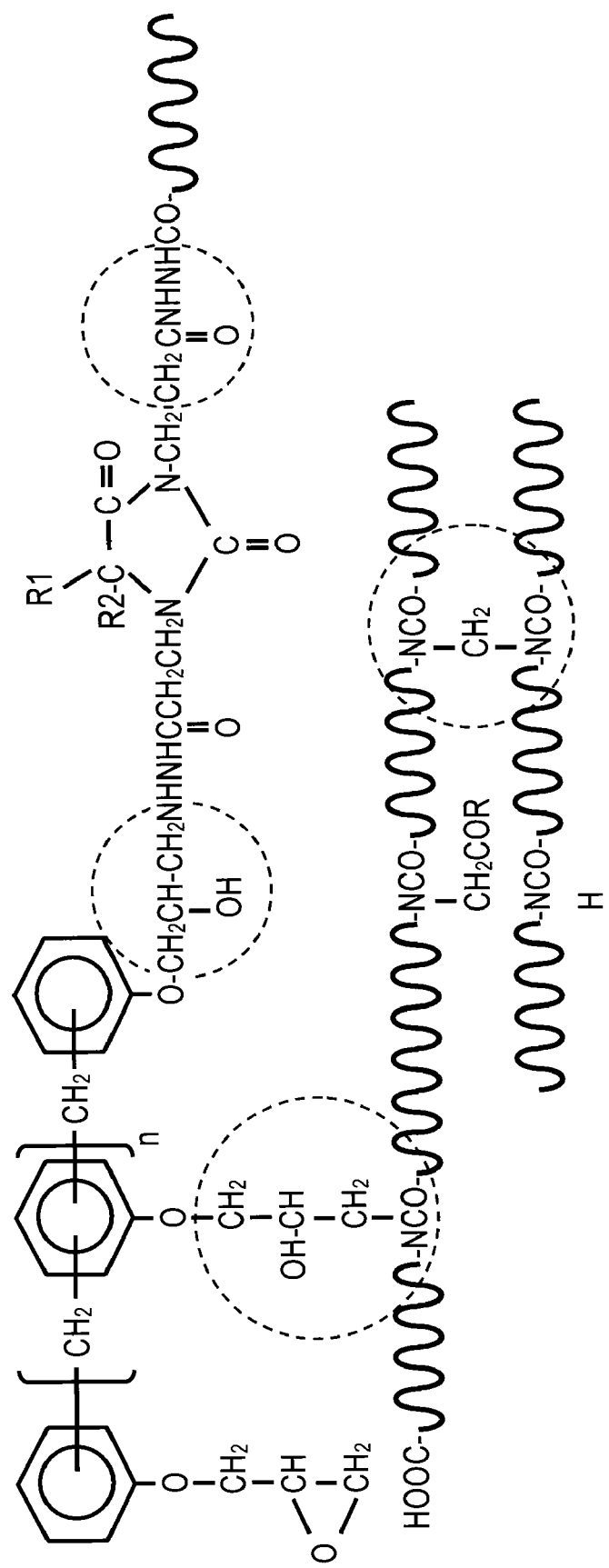
FIG. 4 is a conceptual diagram showing the molecular structure of a thermosetting resin composition for producing rheology.

The rheology of the magnet described in the present invention refers to a thread-like molecular chain in which portions of the component of a thermosetting resin composition are entwined and is uniformly included in the pre-molding segment magnets, as shown in the conceptual diagrams of FIGS. 3A and 3B. In addition, viscous deformation such as shearing flow or elongational flow is used as a principle according to heat and external force F-F'. In extrusion compression molded ring magnet 40 of FIG. 2A, for example, the component of the thermosetting resin composition shown in FIG. 4 is made into a three-dimensional network structure by cross-linking reaction and the magnet integrated by thermal compression as shown in FIG. 2A is turned into a rigid body. Accordingly, it is possible to adjust the mechanical strength, heat resistance and durability of the rotor in which the magnet according to the present invention and the iron core are combined as shown in FIG. 2A.

FIG. 4 is a conceptual diagram showing the molecular structure of a thermosetting resin composition including novolac type epoxy oligomer, linear polyamide, and 2-phenyl-4,5-dihydroxymethylimidazole. FIG. 4 is an example of the thermosetting resin composition adjusted so as to apply rheology to the magnet according to the present invention. A dotted circle shown in FIG. 4 shows the molecular structure of a cross-linking portion. In the example of FIG. 4, when the linear polyamide is in a molten state, the entwined thread-like molecular chain is uniformly included in a matrix of a magnetic pole. In addition, the magnet is deformed by shearing flow or elongational flow according to external force F-F'. The thermosetting resin composition which applies flow shown in FIGS. 3A and 3B is necessarily not limited to that shown in FIG. 4.

The torque density of the small-sized motor is proportional to the static magnetic field Ms generated by the magnetic pole, that is, gap magnetic flux density between the magnetic pole and the stator iron core. The gap magnetic flux density of the small-sized motor formed by the stator iron core and the magnet having the same dimension and the same structure is generally proportional to the square root of a ratio of energy density (BH) max of the magnet. With respect to an isotropic $Nd_2Fe_{14}B$ bond magnet having the level of the energy density (BH) max of 80 kJ/m$^3$ as an upper limit, if the energy density (BH) max value of the magnetic pole according to the present invention is 160 kJ/m$^3$ or more, the increase in torque density of about 1.4 times is expected. Accordingly, the rare-earth/iron-based ring magnet, anisotropy of which is controlled in the continuous direction, according to the present invention preferably has residual magnetization Mr of 0.95 T or more, magnetic coercive force HcJ of 0.9 MA/m or more, and energy density (BH) max of 160 kJ/m$^3$ or more, from the viewpoint that torque density is increased.

In order to obtain the magnet according to the present invention having energy density (BH) max≧160 kJ/m$^3$, the volume ratio of the rare-earth/iron-based magnet material having energy density (BH) max≧270 kJ/m$^3$ occupied in the magnet is preferably set to 80 vol. % or more.

As the anisotropic rare-earth/iron-based magnet material according to the present invention, for example, there is RD (Reduction and Diffusion)-$Sm_2Fe_{17}N_3$ written by A. Kawamoto and others of Non-patent Document 12 or so-called HDDR-$Nd_2Fe_{14}B$ manufactured by hydrogenation of (R2 [Fe, Co] 14B) phase (Hydrogenation, R2 [Fe, Co] 14BHx), decomposition at 650 to 1000° C. (Decomposition, $RH_2$+Fe+ $Fe_2B$), desorption and Recombination, written by T. Takeshita and others of Non-patent Document 13.

Example

Hereinafter, a rare-earth/iron-based ring magnet, anisotropy of which is controlled in a continuous direction, according to the present invention will be described in more detail, using an 8-pole-12-slot surface mounted permanent magnet synchronous motor (SPMSM) as an example. The present invention is not limited to the present example.

Figure 5:
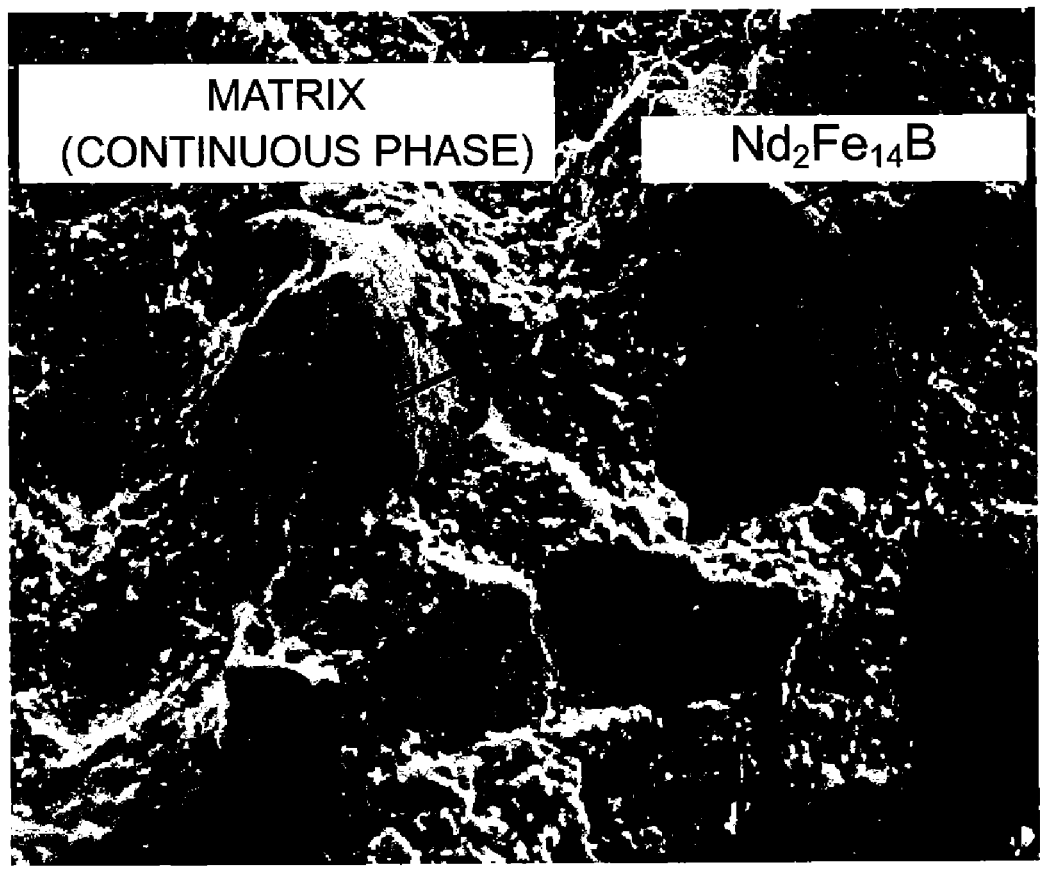
FIG. 5 is a view showing an electronic microscope photo of a macro structure of a magnetic anisotropic magnetic pole.

First, FIG. 5 is a view showing a scanning electronic microscope (SEM) photo of a macro structure of a magnet having density of 6.01 Mg/m$^3$ according to the present invention. The anisotropic $Sm_2Fe_{17}N_3$-based rare-earth/iron-based magnet material and the anisotropic $Nd_2Fe_{14}B$-based rare-earth/iron-based magnet material are heated at 160° C. together with the thermosetting resin composition and an orientation magnetic field in which a uniform external magnetic field is set to 1.4 MA/m is applied, and compression molding is performed with pressure of 20 to 50 MPa, thereby forming segments. Here, the anisotropic $Sm_2Fe_{17}N_3$-based rare-earth/iron-based magnet material has a particle diameter of 3 to 5 µm and energy density (BH) max of 290 kJ/m$^3$. In addition, the anisotropic $Nd_2Fe_{14}B$-based rare-earth/iron-based magnet material has a particle diameter of 38 to 150 µm and energy density (BH) max of 270 to 300 kJ/m$^3$. As shown in FIG. 5, the macro structure of the magnet is characterized in that the $Nd_2Fe_{14}B$-based rare-earth/iron-based magnet material has a structure separated in the matrix (continuous phase) including $Sm_2Fe_{17}N_3$-based rare-earth magnet fine powder and thermosetting resin composition. In addition, the volume ratio of the $Sm_2Fe_{17}N_3$-based and $Nd_2Fe_{14}B$-based rare-earth/iron-based magnet material is 81 vol. %.

Figure 6A:
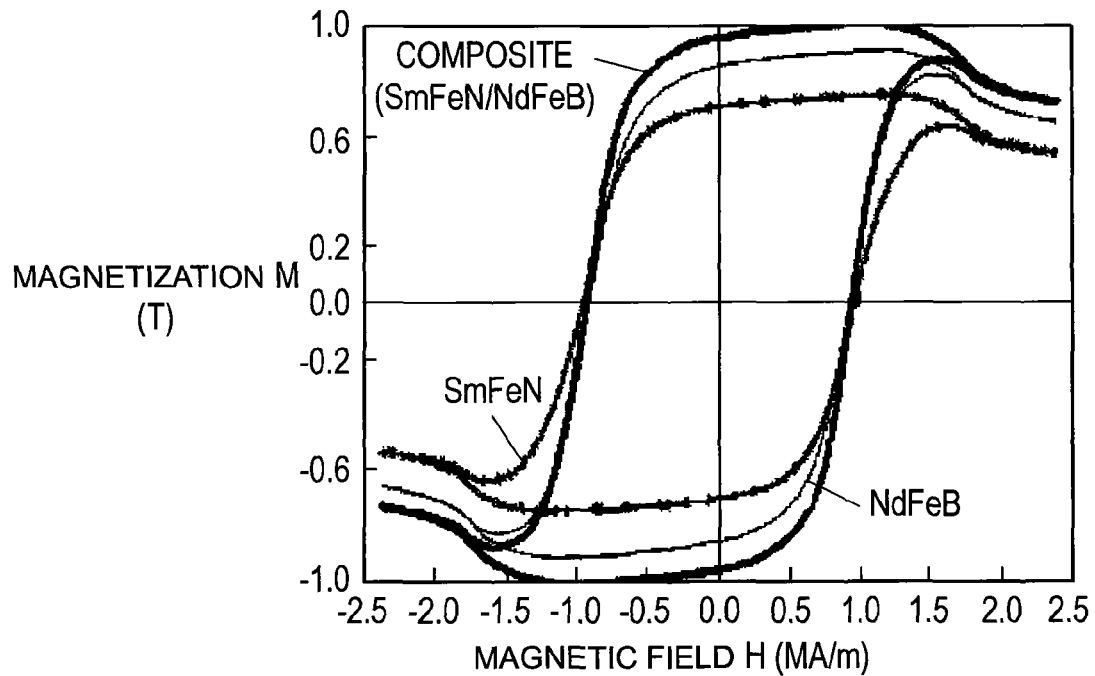
FIG. 6A is a characteristic diagram showing an M-H loop of a magnet.
Figure 6B:
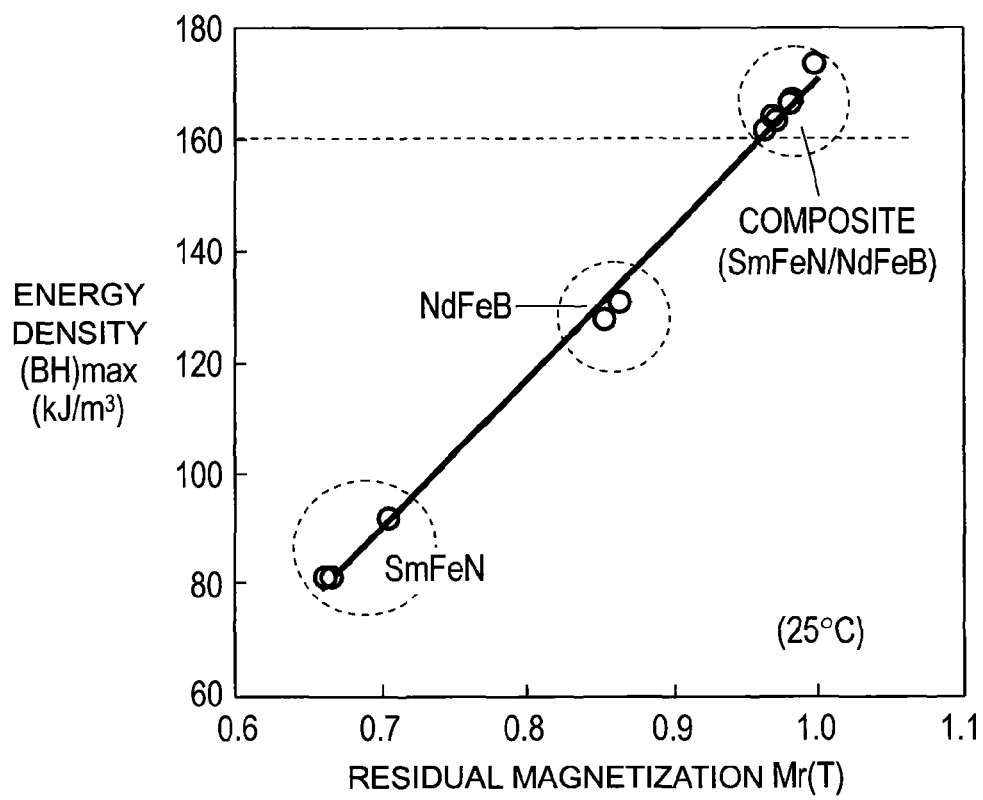
FIG. 6B is a characteristic diagram showing residual magnetization and energy density.

FIG. 6A is a characteristic diagram showing comparison between M-H loops of the magnet according to the present invention having the macro structure shown in FIG. 5 and the magnet manufactured under the same condition using the magnet material as the $Sm_2Fe_{17}N_3$-based or $Nd_2Fe_{14}B$-based rare-earth/iron-based magnet material. The measured magnetic field is ±2.4 MA/m. As can be seen from FIG. 6A, magnetic coercive force HcJ is substantially equal at about 1 MA/m and residual magnetization Mr is different. If a relationship between residual magnetization Mr and energy density (BH) max of the magnets is plotted, FIG. 6B is obtained. If the configuration according to the present invention is used as shown in FIG. 6B, energy density (BH) max reaches 160 to 180 kJ/m$^3$.

Meanwhile, the thermosetting resin composition includes novolac type epoxy oligomer having epoxy equivalent of 205 to 220 g/eq shown in FIG. 4 and a melting point of 70 to 76° C., linear polyamide having a melting point of 80° C. and a molecular weight of 4,000 to 12,000, and 2-phenyl-4,5-dihydroxymethylimidazole. They are not gelled and the linear polyamide is re-molten by heat and is uniformly included in the magnet as the entwined thread-like molecular chain. In addition, shearing flow and elongational flow are caused according to the direction of heat and external force shown in FIG. 3B. Accordingly, rheology characteristics corresponding to FIG. 1A, FIG. 1B and FIG. 2A are obtained.

Figure 7A:
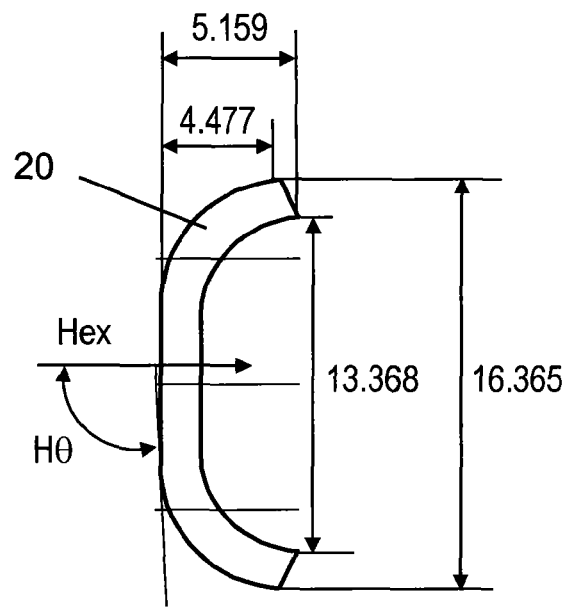
FIG. 7A is a shape diagram showing an example of a segment.
Figure 7B:
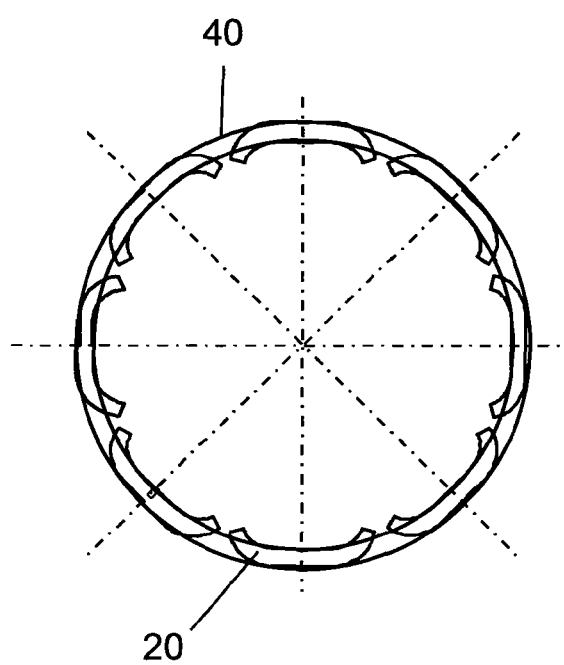
FIG. 7B is a cross-sectional view showing a positional relationship between a segment and a ring magnet.

FIGS. 7A and 7B are shape diagrams of segment magnet 20 having the macro structure according to the present invention and extrusion compression molded ring magnet 40, that is, the shape diagrams before and after processing. Here, angle Hθ between the uniform external magnetic field Hex shown in FIG. 7A and the tangent line of the segment at an arbitrary position corresponds to angles Mc and Md of magnetization vector M of the tangent line of the position of an arbitrary mechanical angle φ of the inner/outer circumference of the ring magnet. That is, Hθ≅Mc and Hθ≅Md. Here, in the setting of angle Hθ between external magnetic field Hex and the inner/outer circumferential tangent line as shown in FIG. 1A, a pitch of 0.3655 mm is set in the outer circumference of the segment and a pitch of 0.2845 mm is set in the inner circumference. As an aggregate of a total of 96 rigid bodies bisected based on the center of a radial-direction magnetic pole, the segment shape of FIG. 7A is set by non-linear structure analysis in which the respective rigid bodies are rotated.

Next, as described with reference to FIGS. 2A and 2B, pre-molding segments 20 are compression molded so as to form ring magnet 40.

Next, extrusion compression molded ring magnet 40 according to the present invention is demolded from the mold, and is then subjected to heating treatment in an atmosphere at 170° C. for 20 minutes. Then, the thermosetting resin composition including linear polyamide was cross-linked as shown in FIG. 4. In FIG. 4, free epoxy groups are shown, but they react with imidazoles or amino active hydrogen in a linear polyamide molecular chain or terminal carboxy groups so as to be turned to a rigid body.

The obtained ring magnet according to the present invention has an accuracy such as an outer diameter of 50.3 mm, an inner diameter of 47.3 mm, a thickness of 1.5 mm, a length of 13.5 mm, concentricity of 0.060 mm or less, a roundness which is a difference between a maximum inner diameter and a minimum inner diameter of 0.225 mm or less. This ring magnet was finally combined with an iron core so as to form an 8-pole ring magnet rotor having an outer diameter of 50.3 mm and a length of 13.5 mm like a ring magnet rotor 43 of FIG. 2A.

Next, using a magnetization yoke of 2 turn/coil and a pulse magnetization power source, first, an instantaneous strong magnetic field was applied to the 8-pole ring magnet rotor at a pulse current wave peak value of Ip=10 kA. The rotor in the magnetization yoke is rotated according to an anisotropic direction and the distribution thereof such that the magnetic poles of the rotor and the magnetization yoke are positioned. Subsequently, the rotor magnet was magnetized by pulse magnetization of Ip=25 kA.

Figure 8A:
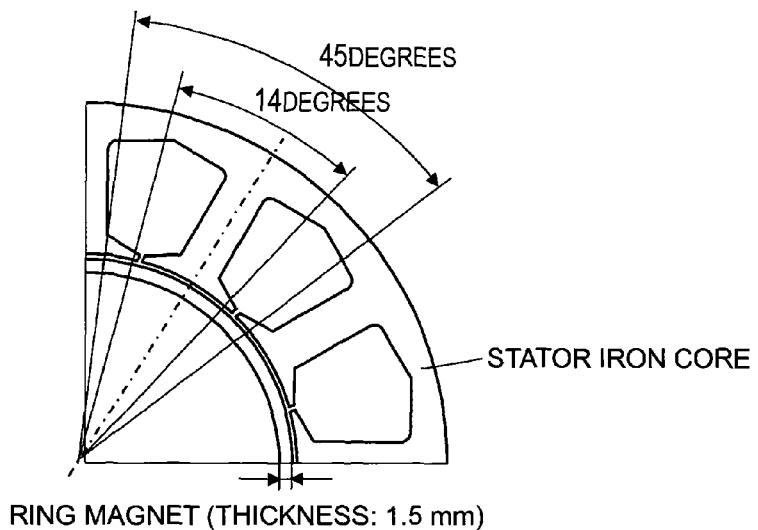
FIG. 8A is a configurational view showing a radial region and a non-radial region.
Figure 8B:
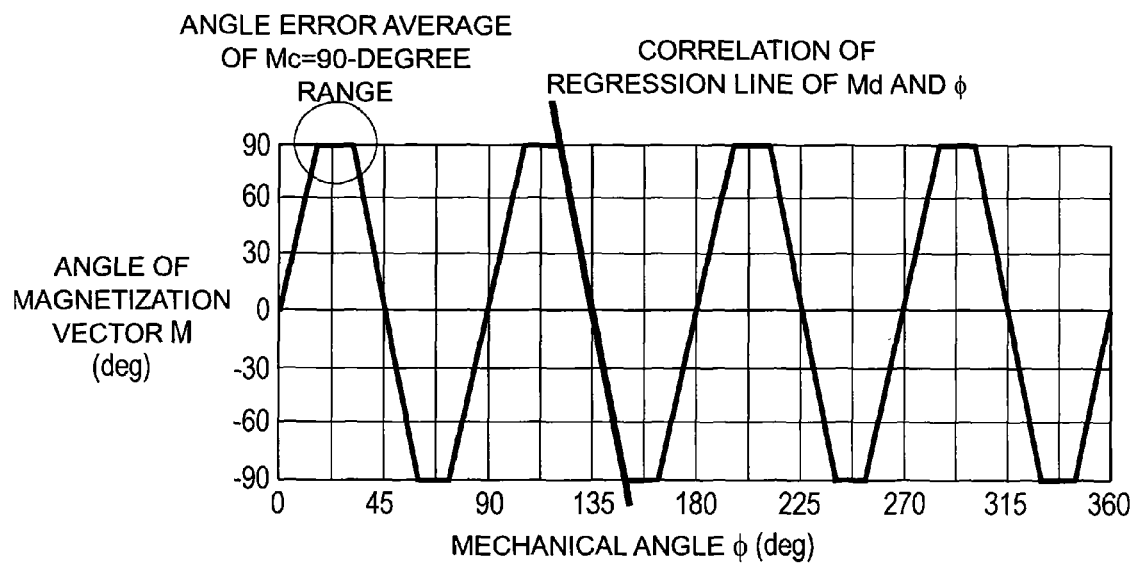
FIG. 8B is a characteristic diagram showing a relationship between a mechanical angle and a magnetization vector.

Next, in the present embodiment, the mechanical angle of the stator iron core teeth shown in FIG. 8A was φ=14 degrees and the mechanical angle of one pole of the ring magnet was φ=45 degrees. In addition, when the magnetization vector angle of the circumferential tangent line of the radial region at the magnetic pole center of the ring magnet shown in FIG. 8B is Mc and the magnetization vector angle of the circumferential tangent line of the non-radial region is Md, Mc=90 degrees. In addition, the measurement of magnetization vector angle M was performed in a state in which a synthetic magnetization vector angle M of a diameter direction, a tangent line direction and an axial direction indicate a magnetization easy axis direction, and measurement of 25 points per 1 degree was performed by a three-dimensional hall probe tesla meter. In the evaluation of the magnetization vector angle M and the distribution thereof, an angle error average of 90 degrees was used in the radial region and correlation coefficient of a regression equation of Md of the mechanical angle φ was used in the non-radial region as shown in FIG. 8B.

Figure 9:
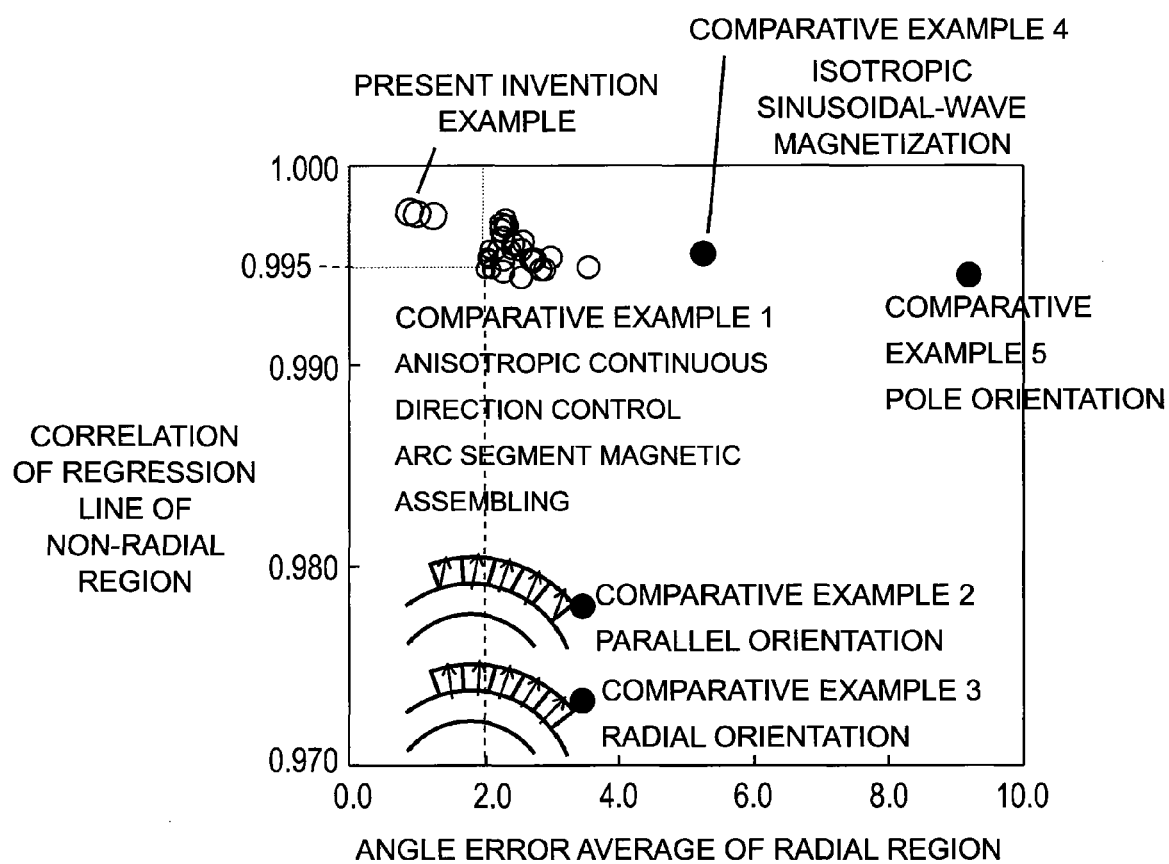
FIG. 9 is a characteristic diagram showing a relationship between an angle error of a radial region and correlation coefficient of a regression line of a magnetization vector to a mechanical angle of a non-radial region.

FIG. 9 is a characteristic diagram in which a relationship between an angle error average of a radial region of a ring magnet rotor having energy density (BH) max of 160 to 180 kJ/m$^3$ according to the present invention and correlation coefficient of a regression line of a non-radial region are plotted. As Comparative Examples 1 to 5, the direction of a magnetization vector of an 8-pole magnet rotor having the same outer diameter and distribution accuracy are shown. Comparative Example 1 is a rotor in which an anisotropic continuous direction control arc segment magnet of 160 to 180 kJ/m$^3$ is assembled. Comparative Example 2 is a radial anisotropic Nd$_2$Fe$_{14}$B-based ring magnet rotor manufactured in a parallel orientation magnetic field of 130 to 140 kJ/m$^3$. Comparative Example 3 is a radial anisotropic Nd$_2$Fe$_{14}$B-based ring magnet rotor manufactured in a radial orientation magnetic field. Comparative Example 4 is a sinusoidal-wave magnetization isotropic Nd$_2$Fe$_{14}$B-based ring magnet rotor of 80 kJ/m$^3$. Comparative Example 5 is a polar anisotropic ferrite ring magnet rotor of 16 kJ/m$^3$. Here, as the correlation coefficient of the regression line of the non-radial region is increased, cogging torque is decreased and, as the angle error average of the radial region is decreased, the static magnetic field generated by the magnetic pole easily reaches the stator iron core. From this viewpoint, it is apparent that the example of the present invention is ideally preferable than any comparative example in the magnetization vector, that is, the anisotropic direction and the distribution thereof. For example, in the configuration in which the arc segment magnet, anisotropy of which is controlled in the direction, is assembled in the periphery of the iron core like Comparative Example 1, an assembling error is caused and a deviation is increased. In the conventional rotor, anisotropy of which is not controlled in the direction like Comparative Examples 2 and 3, it may be estimated that the correlation coefficient of the regression line of the non-radial region is remarkably reduced and cogging torque is increased. Even when the correlation coefficient of the regression line of the non-radial region is high like Comparative Examples 4 and 5, the static magnetic field generated by the magnetic pole is hard to be delivered to the stator iron core if the angle error average of the radial region is increased.

Next, a columnar magnet having a diameter of 1 mm was obtained from the region corresponding to the angles Hθ, Mc and Md of the arbitrary mechanical angle φ in the segment and the magnetic pole of the ring magnet. The result of analyzing the anisotropic angle and the degree thereof from the columnar magnet is shown. First, when the center position of the columnar magnet is the angles Hθ, Mc and Md of the mechanical angle φ, the angle in which maximum magnetization Ms in the overall direction of the columnar magnet becomes a maximum, that is, the angles Hθ, Mc and Md of the mechanical angle φ were obtained. As a result, the difference of residual magnetization Mr at the same position as the segment and the ring magnet was 0.03 T or less.

Meanwhile, the anisotropic degree was evaluated using an anisotropic dispersion σ. Here, in the anisotropic dispersion σ, that is, analysis of the distribution of the anisotropic direction (C-axis), ψ was determined from a solution in which overall energy E of the columnar magnet becomes a minimum, that is, $(\delta E/\delta \psi) = Ku \times \sin^2 \psi - Ms \times H \times \sin(\psi - \psi o) = 0$, in overall energy $E = Ku \times \sin^2 \psi - Ms \times H \times \cos(\psi - \psi o)$ of rotation magnetization. From $M = Ms \times \cos(\psi o - \psi)$, an M-H loop in which M becomes a maximum is measured by a sample vibration-type magnetometer (VSM). In addition, ψ was obtained from $Ku \times \sin^2 \psi - Ms \times H \times \sin(\psi - \psi o) = 0$, a probability distribution of ψ was applied such that an overall orientation state, that is, the anisotropic distribution σ was obtained. ψo denotes the angle of the external magnetic field, ψ denotes the rotation angle of Ms, Ms denotes spontaneous magnetic moment, Ku denotes a magnetic anisotropic constant, and E denotes the overall energy.

As a result, when the center position of the columnar magnet is set to an Mθ setting angle, the angles in which residual magnetization Ms in the overall direction of the columnar sample becomes a maximum, that is, angles Hθ and Mc and Md with respect to φ were substantially equal. In addition, the value of the anisotropic dispersion σ of the segment and the ring magnet is 7% or less at most and this level is equal in consideration of a measurement error. This proves that only the anisotropic direction is changed without deteriorating the anisotropic degree, that is, energy density (BH) max, when the regions are rotated in a process of making an odd-shaped magnet into an arc magnet.

Figure 10A:
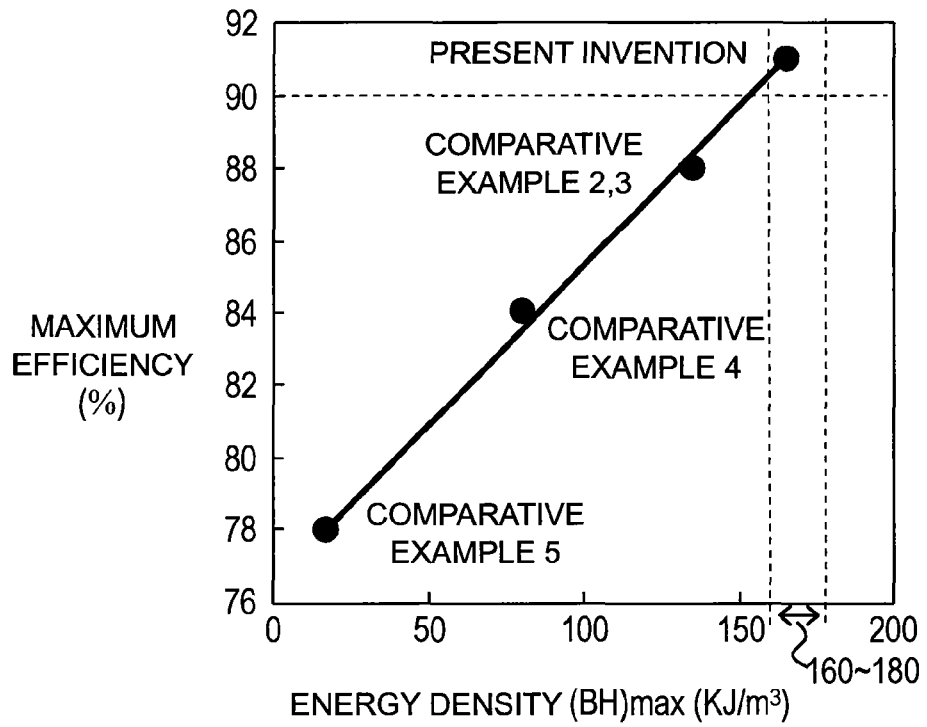
FIG. 10A is a characteristic diagram showing an example of energy density and motor efficiency (maximum value).
Figure 10B:
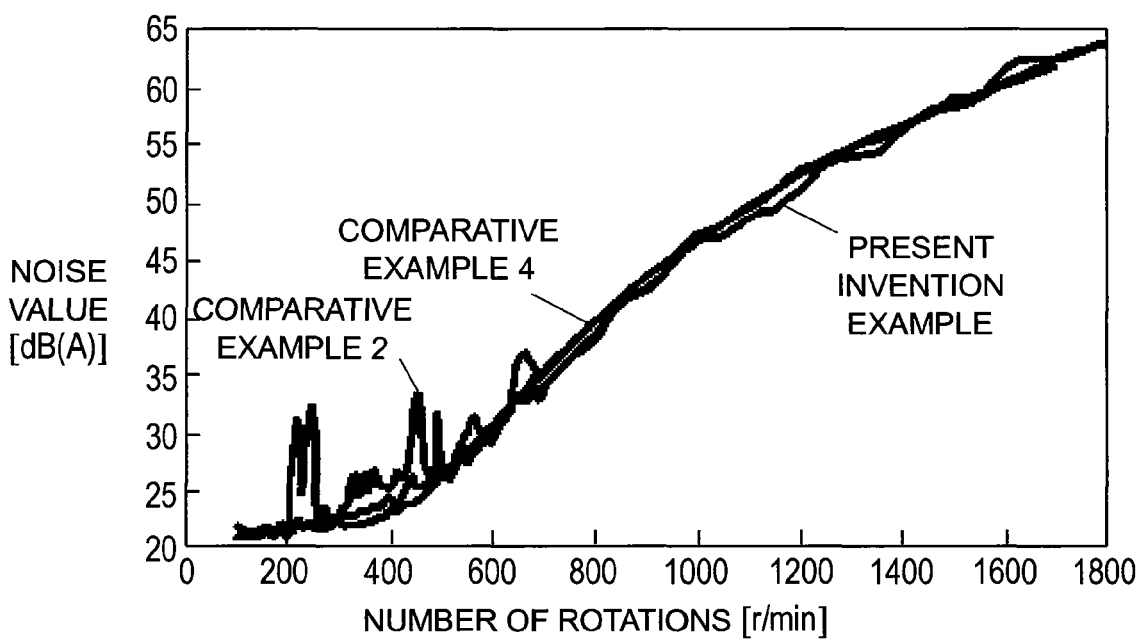
FIG. 10B is a characteristic diagram showing an example of the number of rotations and a noise value.
Figure 11A:
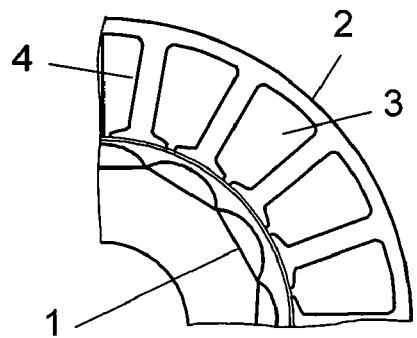
FIG. 11A is a conceptual diagram showing a conventional cogging torque reduction method using an uneven thickness.
Figure 11B:
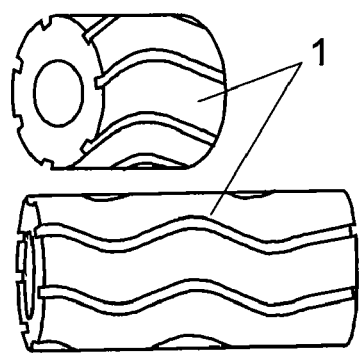
FIG. 11B is a conceptual diagram showing a conventional cogging torque reduction method according to skewing.
Figure 11C:
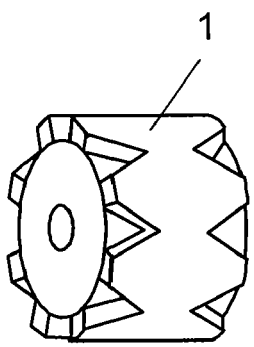
FIG. 11C is a conceptual diagram showing a conventional cogging torque reduction method according to a magnetic pole area.
Figure 12A:
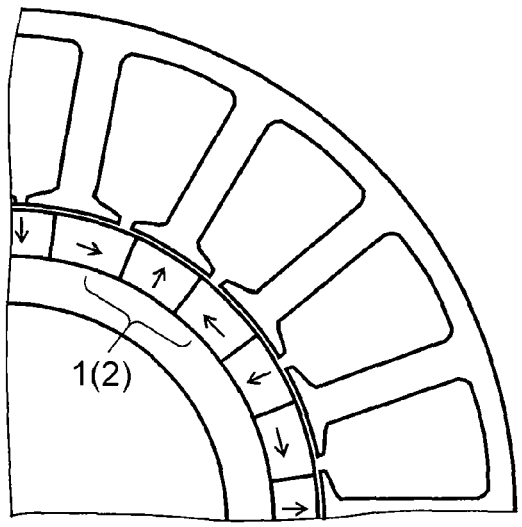
FIG. 12A is a first conceptual diagram showing a conventional cogging torque reduction method according to discontinuous control of a magnetization direction.
Figure 12B:
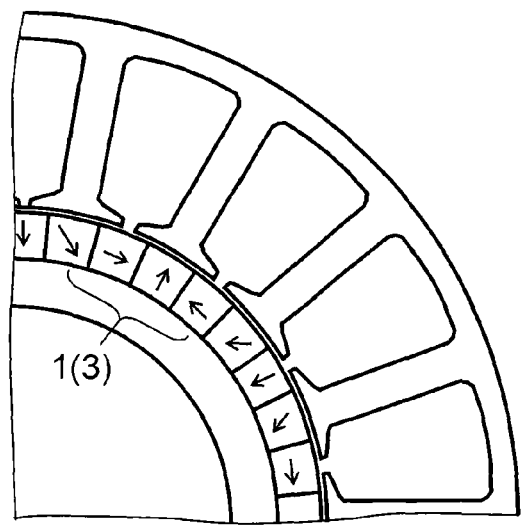
FIG. 12B is a second conceptual diagram thereof.
Figure 12C:
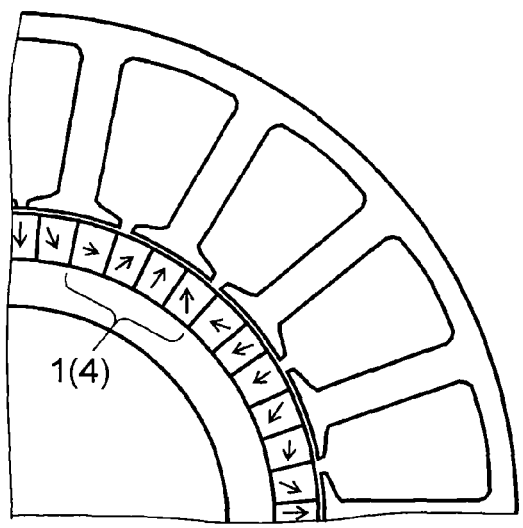
FIG. 12C is the second conceptual diagram thereof.
Figure 12D:
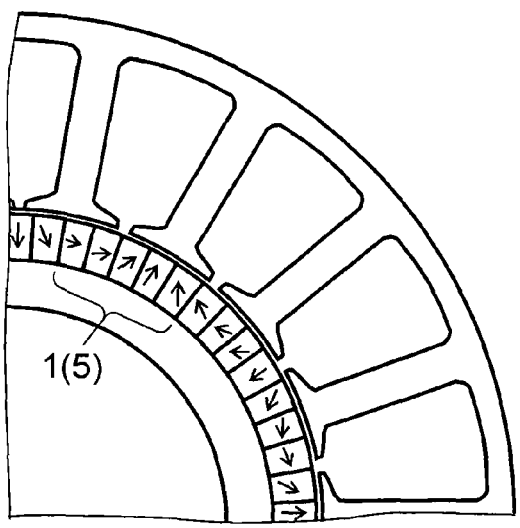
FIG. 12D is the second conceptual diagram thereof.
Figure 13:
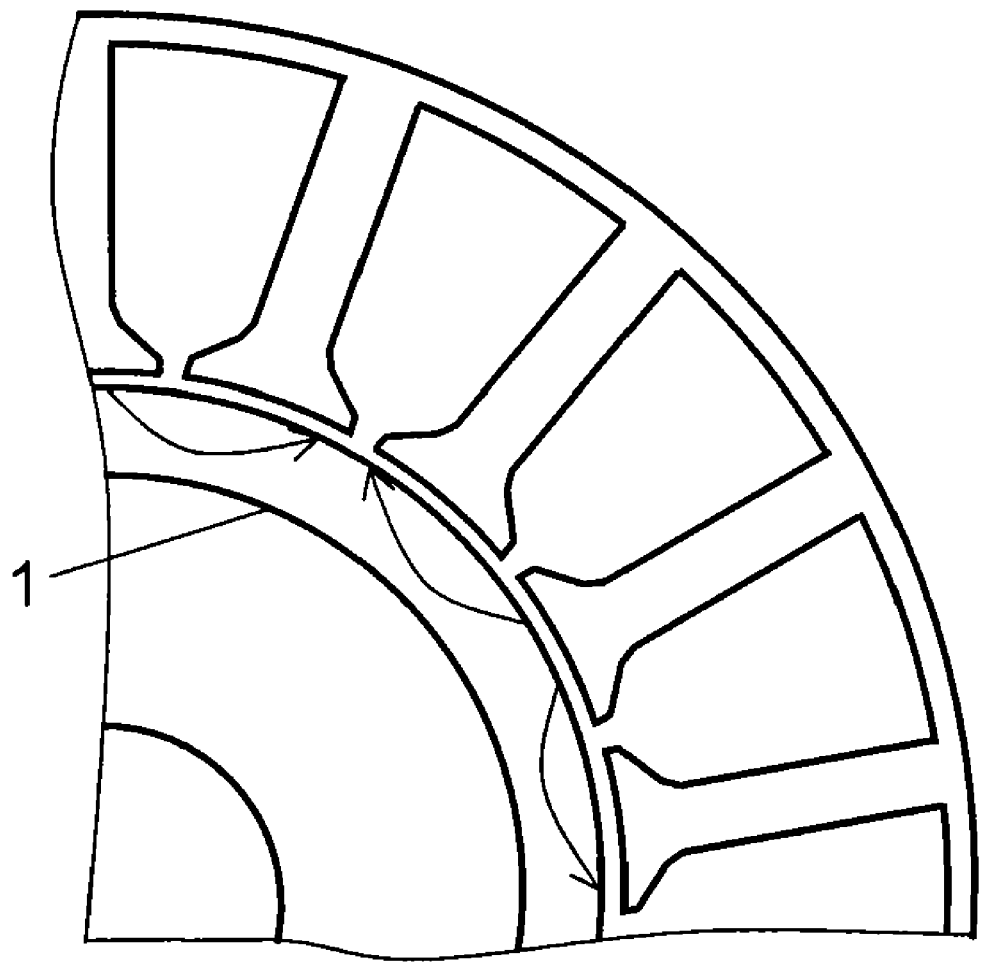
FIG. 13 is a conceptual diagram showing a magnetization pattern of an isotropic magnet.

FIG. 10A shows a relationship between motor efficiency (highest value) of a 40-W surface mounted permanent magnet synchronous motor (SPMSM), in which a 12-slot stator iron core having the same specification and various types of 8-pole magnet rotors shown in FIG. 9 are combined, and energy density. FIG. 10B shows a relationship between the number of rotations of SPMSM and a noise value. For example, in the present invention example having energy density (BH) max of 160 to 180 kJ/m³, highest efficiency exceeds 90%. By the continuous direction control of anisotropy, the noise value of a low-speed rotation region of 200 to 700 r/min of the radial anisotropic magnet is reduced by 10 dB as a maximum and the same noise reduction as sinusoidal-wave magnetization isotropic $Nd_2Fe_{14}B$-based magnet rotor is obtained.

According to the present invention, by providing a method of manufacturing an anisotropic ring magnet, it is possible to increase energy density (BH) max which is the demerit of an isotropic magnet 2 times or more so as to increase the torque density of the small-sized motor and to reduce an obstacle due to cogging torque of a radial anisotropic magnet having the same shape, for example, noise.

INDUSTRIAL APPLICABILITY

The motor according to the present invention makes available for noise reduction, high efficiency, energy conservation or the like and thus industrial applicability thereof is very high.

DESCRIPTION OF REFERENCE NUMERALS AND SIGNS

10: SEGMENT
11: INNER/OUTER CIRCUMFERENTIAL SECTION
20: SEGMENT MAGNET
21: THRUST-DIRECTION SEGMENT END SURFACE
30: EXTRUSION MOLDING CORE
35: EXTRUSION COMPRESSION MOLDING DIE
40: EXTRUSION COMPRESSION MOLDED RING MAGNET
41: DEMOLDED THERMALLY-HARDENED RING MAGNET
42: ROTOR IRON CORE
43: RING MAGNET ROTOR
$\phi$: MECHANICAL ANGLE
Mc: MAGNETIZATION VECTOR ANGLE (OF MAGNETIC POLE CENTER (RADIAL REGION))
Md: MAGNETIZATION VECTOR ANGLE (OF MAGNETIC POLE END (NON-RADIAL REGION))
Hex: EXTERNAL MAGNETIC FIELD
H$\theta$: ANGLE (OF EXTERNAL MAGNETIC FIELD)

The invention claimed is:

1. A method of manufacturing a rare-earth/iron-based ring magnet, anisotropy of which is controlled in a continuous direction, the method comprising:
a first step of, when an angle between a direction of a uniform external magnetic field Hex and an inner/outer circumferential tangent line corresponding to an arbitrary mechanical angle $\phi$ of a rotor is H$\theta$, molding segments having inner/outer circumferential sections, which change the angle H$\theta$ corresponding to the mechanical angle $\phi$, in a magnetic field according to the external magnetic field Hex; and
a second step of arranging a plurality of segments on a circumference according to a number of poles, extruding the segments in a ring shape using rheology based on viscous deformation of the segments from one thrust-direction end surface of the segments, and compression molding the segments from both thrust-direction end surfaces so as to control anisotropy in the continuous direction.

2. The method of claim 1, wherein, when the mechanical angle of stator iron core teeth using a rotation axis center as an origin is $\phi$s and the mechanical angle of a rotor magnetic pole center using the rotation axis center as an origin is $\phi$r, an error average for 90 degrees of a magnetization vector angle Mc of a rotation direction tangent line of a magnetic pole in a region corresponding to $\phi s \cong \phi r$ is 2 degrees or less and, when a magnetization vector angle of a non-radial region which reaches from the magnetization vector angle Mc to a 90-degree region Mc of an adjacent magnetic pole is Md, correlation r of a regression equation of the mechanical angle $\phi$ and the magnetization vector angle Md is 0.995 or more.

3. The method of claim 1, wherein a difference in residual magnetization Mr between a pre-molding segment and the ring magnet is 0.03 T or less and a difference in anisotropic dispersion $\sigma$ is less than 7%.

4. The method of claim 1, wherein residual magnetization Mr of the anisotropic direction of the ring magnet is 0.95 to 1.05 T and magnetic coercive force HcJ is 0.85 to 0.95 MA/m, and energy density (BH) max is 160 to 180 kJ/m³.

5. The method of claim 1, wherein the diameter of the ring magnet is 25 mm or less.

\* \* \* \* \*